(12) United States Patent
Strache et al.

(10) Patent No.: US 7,151,495 B2
(45) Date of Patent: Dec. 19, 2006

(54) TRANSPONDER CONFIGURATION, TIRE INCLUDING A TRANSPONDER, AND METHOD OF PRODUCING A TIRE HAVING A TRANSPONDER

(75) Inventors: Wolfgang Strache, Hannover (DE); Holger Behrends, Hannover (DE); Carla Recker, Hannover (DE); Rainer Baumgarten, Wietzendorf (DE); Andreas Wulf, Auhagen (DE); Roland Jenke, Hademstorf (DE); Sadettin Fidan, Garbsen (DE); Olaf Campsheide, Neinburg (DE)

(73) Assignee: Continental Aktiengesellschaft, Hannover (DE)

( * ) Notice: Subject to any disclaimer, the term of this patent is extended or adjusted under 35 U.S.C. 154(b) by 427 days.

(21) Appl. No.: 10/447,414

(22) Filed: May 29, 2003

(65) Prior Publication Data

US 2003/0221766 A1    Dec. 4, 2003

(30) Foreign Application Priority Data

May 29, 2002    (DE)    ............................... 102 23 800

(51) Int. Cl.
- *H01Q 1/32* (2006.01)
- *H01Q 9/16* (2006.01)
- *B60C 19/00* (2006.01)
- *B60C 19/08* (2006.01)
- *B60C 23/00* (2006.01)
- *B60C 23/02* (2006.01)

(52) U.S. Cl. .................. 343/713; 343/793; 340/442; 152/152.1

(58) Field of Classification Search ............... 343/713, 343/793; 152/152.1; 340/442
See application file for complete search history.

(56) References Cited

U.S. PATENT DOCUMENTS

| 4,763,133 | A  | * | 8/1988  | Takemura et al. | ........... 343/912 |
| 5,818,385 | A  | * | 10/1998 | Bartholomew     | .............. 342/372 |
| 6,121,932 | A  | * | 9/2000  | McCoy et al.    | ........ 343/700 MS |
| 6,630,910 | B1 | * | 10/2003 | Forster et al.  | .............. 343/806 |
| 2003/0156024 | A1 | * | 8/2003 | Beckley         | ...................... 340/447 |

FOREIGN PATENT DOCUMENTS

WO    02/13309 A1    2/2002

* cited by examiner

*Primary Examiner*—Don Wong
*Assistant Examiner*—Marie Antoinette Cabucos
(74) *Attorney, Agent, or Firm*—Laurence A. Greenberg; Werner H. Stemer; Ralph E. Locher

(57) ABSTRACT

A transponder to be fitted in or on a surface of an article which is substantially formed of a rubber product, in particular a transponder to be fitted in a tire, has a dipole antenna. The antenna length $L_{air}$, wherein air is exclusively present as the transmission medium, is calculated with the equation $L_{air}=0.5 \times c/f$, wherein c is the speed of light and f is the transmission frequency. In order to achieve a long transmission range, the transponder in the rubber product has an antenna length $L_{kp}$ between $0.45 \times L_{air}$ and $0.90 \times L_{air}$, preferably substantially between $0.61 \times L_{air}$ and $0.71 \times L_{air}$.

20 Claims, 3 Drawing Sheets

TRANSPONDER CONFIGURATION, TIRE INCLUDING A TRANSPONDER, AND METHOD OF PRODUCING A TIRE HAVING A TRANSPONDER

BACKGROUND OF THE INVENTION

Field of the Invention

The invention relates to transponders to be fitted in or on the surface of articles which are substantially formed of a rubber product. The invention relates in particular to transponders to be provided in a tire, wherein the transponder has a dipole antenna and wherein the antenna length $L_{air}$, for the case when only air is present as the transmission medium, is calculated with the equation $L_{air}=0.5\times c/f$, where c is the speed of light and f is the transmission frequency. The invention further relates to a tire including a transponder and to a method of producing a tire having a transponder.

Transponders are used in tires for various tasks. Transponders are in particular used for identifying the tire, which allows an automobile manufacturer to determine, inter alia, in a rapid and automated manner from which tire factory a specific tire was delivered. Other tasks may include inflation pressure monitoring, temperature measurement, measurement of mechanical stress conditions in the tire or measurement of the mileage covered by the tire. Modern transponders include an electronic device or chip, in which sensor elements may be provided, and an antenna connected to this electronic device.

For an optimum transmission range between a transponder with a dipole antenna and the transmitting and receiving device disposed outside the tire, it is necessary for the antennas to be of a specific length. The optimum antenna length, at which the transmission takes place exclusively via air as the medium, is calculated in good approximation with the following equations.

$$c = f \times \lambda \quad (1)$$

The symbol c stands for the speed of light, which is approximately $3 \times 10^8$ m/s. The variable f indicates the transmission frequency, which for purposes of illustrating this example is assumed to be 915 MHz. Using equation (1), a value of 0.328 m would be calculated for the wavelength $\lambda$.

The optimum antenna length is, in good approximation, half this value:

$$L_{air} = 0.5 \times \lambda \quad (2)$$

Accordingly, at a transmission frequency of 915 MHz in air, the optimum antenna length is approximately 16.4 cm. So-called edge effects may cause the optimum dipole length to deviate slightly from the half-wavelength. In the case of providing a transponder with such an antenna length in a tire, there is the disadvantage that the surrounding tire material reduces the transmission range of the transponder considerably. The reduction of the transmission range of the transponder is attributable both to the surrounding rubber material and to the various reinforcements which are provided in different layers of the tire.

SUMMARY OF THE INVENTION

It is accordingly an object of the invention to provide a transponder configuration which overcomes the above-mentioned disadvantages of the heretofore-known transponders of this general type and which can be fitted in a rubber product and which has the greatest possible transmission range to a transmitting and receiving device disposed outside the rubber product.

With the foregoing and other objects in view there is provided, in accordance with the invention, a transponder configuration, including:

a transponder configured to be fitted in an article substantially formed of a rubber product or on a surface of an article substantially formed of a rubber product, in particular a transponder to be fitted in a tire;

the transponder having a dipole antenna, the dipole antenna defining a calculated antenna length $L_{air}$ for a case when only air is present as a transmission medium, the calculated antenna length $L_{air}$ resulting from an equation $L_{air}=0.5\times c/f$, where c is a speed of light and f is a transmission frequency; and the dipole antenna having an antenna length $L_{kp}$ between $0.45 \times L_{air}$ and $0.90 \times L_{air}$, preferably substantially between $0.61 \times L_{air}$ and $0.71 \times L_{air}$.

In other words, according to the invention, there is provided a transponder for fitting in or on the surface of articles which substantially include a rubber product, in particular transponders for fitting in a tire, the transponder having a dipole antenna, the antenna length $L_{air}$ of which, in the case in which air is exclusively present as the transmission medium, is calculated from the equation $L_{air}=0.5\times c/f$, in which c is the speed of light and f is the transmission frequency, wherein the transponder has an antenna length $L_{kp}$ in the length range between $0.45 \times L_{air}$ and $0.90 \times L_{air}$, preferably around 0.61 to $0.71 \times L_{air}$.

With the objects of the invention in view there is also provided, a tire configuration, including:

a tire having a surface;

a transponder disposed in the tire or on the surface of the tire;

the transponder having a dipole antenna, the dipole antenna defining a calculated antenna length $L_{air}$ for a case when only air is present as a transmission medium, the calculated antenna length $L_{air}$ resulting from an equation $L_{air}=0.5\times c/f$, where c is a speed of light and f is a transmission frequency; and the dipole antenna having an antenna length $L_{kp}$ between $0.45 \times L_{air}$ and $0.90 \times L_{air}$, preferably substantially between $0.61 \times L_{air}$ and $0.71 \times L_{air}$.

In other words, according to the invention, there is provided, a tire with a transponder, which is disposed on the surface or in the tire, the transponder having a dipole antenna, the antenna length $L_{air}$ of which, in the case in which air is exclusively present as the transmission medium, is calculated from the equation $L_{air}=0.5\times c/f$, in which c is the speed of light and f is the transmission frequency, wherein the transponder has an antenna length $L_{kp}$ in the length range between $0.45 \times L_{air}$ and $0.90 \times L_{air}$, preferably around 0.61 to $0.71 \times L_{air}$.

An advantage of the invention is that the transmission range of the transponder fitted in the rubber product is considerably improved or increased by the shortened antenna length. Extensive measurements have shown that the optimum transmission rate with a transponder in a rubber product is surprisingly achieved in the case of an antenna length of between $0.61 \times L_{air}$ and $0.71 \times L_{air}$, preferably around $0.66 \times L_{air}$. In the case of such an antenna length, the transmission rate can be increased considerably in comparison with a transponder with an unshortened antenna length disposed in the rubber product. With decreasing or increasing antenna length, the transmission range decreases steadily. Nevertheless, investigations show that, in the overall length range of $0.45 \times L_{air}$ to $0.90 \times L_{air}$, there is a higher transmission range in comparison with a reference value for air.

According to an advantageous embodiment of the invention, the transmission frequency f lies in the range between 868 and 928 MHz. This frequency range is particularly well matched to the shortened antenna length.

According to a further advantageous embodiment of the invention, the dipole antenna is formed of steel or a steel alloy. The transponder is subjected to high alternating mechanical stresses in the tire, which may for example lead to a rupturing of copper antennas. Steel as an antenna material offers the advantage that it has a high flexural fatigue strength and has proven successful as the material of the steel belt in the tire and can better withstand the loads in the tire.

According to a further advantageous embodiment of the invention, the dipole antenna is formed of a beryllium-copper alloy. This material likewise has a high flexural fatigue strength along with a constant transmission range.

According to a further advantageous embodiment of the invention, the surface of the dipole antenna is coated with brass. It is desirable to have a good adhesion between the transponder and the surrounding rubber material. The brass coating provides optimum adhesion between the dipole antenna and the surrounding rubber material of the tire.

According to a further advantageous embodiment of the invention, there is a silver layer between the steel and the brass layer. The silver layer is preferably between 10 and 100 µm thick. This layer reduces the effective resistance of the antenna (skin effect) and consequently results in an improvement of the quality, resulting for its part in an increase in the transmission range.

According to a further advantageous embodiment of the invention, the dipole antennas are connected to the transponder chip via welded connections. In the case of commercial transponders, the dipole antenna is connected to the transponder chip through the use of a soldered connection. This connecting point may break up in the tire on account of mechanical stresses. The welded connection, on the other hand, withstands much greater loads.

According to another advantageous embodiment of the invention, the transponder chip and its connection to the dipole antenna are disposed in a housing or a protective material. The housing encloses the connecting points or connecting regions to the transponder chip and, as a result, protects these weak points from high mechanical loads.

According to a further advantageous embodiment of the invention, the dipole antenna includes a number of elastically or/and plastically deformable filaments. The antennas have thus highly flexible properties and, as a result, can compensate better for the mechanical stresses occurring.

According to a further advantageous embodiment of the invention, the filaments are in connection with one another via an electrically conductive rubber blend and/or an electrically conductive elastomer blend. As a result, in the event of a filament rupture, the rupture point can be bridged or bypassed through the use of the conductive rubber blend and/or the electrically conductive elastomer blend.

According to a further advantageous embodiment of the invention, the entire transponder is embedded in an electrically nonconductive material. The nonconductive material, for example a rubber blend without carbon black, acts as an insulator with respect to the surrounding rubber material. Empirical investigations show that the transmission range can likewise be increased by approximately 50% by such an embedding. The increase in range is predominantly based on an improvement in the electromagnetic properties of the dipole antenna.

According to a further advantageous embodiment of the invention, the nonconductive material is a nonconductive rubber blend or/and a thermoplastic elastomer. The nonconductive rubber blend may for example be a silica blend or an easy-to-prepare rubber blend without carbon black. The thermoplastic elastomer, on the other hand, offers the advantage of simple processing. The transponder can be embedded into such a material in a simple way.

According to a further advantageous embodiment of the invention, the surface of the dipole antenna is coated with a nonconductive varnish or coating. The insulation with respect to the surrounding rubber material is thus increased even more and, as a result, the transmission range is improved.

According to a further advantageous embodiment of the invention, the transponder is disposed in the tire in the region of the tire bead. Providing the transponder in the tire bead offers the advantage that only relatively low stresses, which could lead to damage of the transponder, occur in this region of the tire.

According to a further advantageous embodiment of the invention, the transponder is disposed in or at the apex during the manufacture of the tire on the apexing machine. The process step at the apexing machine is a process step which is independent of the process steps at the tire-building machine. As a result, the cycle time on the tire-building machine is not reduced by an additional component having to be applied on this machine.

With the objects of the invention in view there is also provided, a method of producing a tire configuration, the method includes the steps of:

providing a transponder with a dipole antenna having an antenna length $L_{kp}$ between $0.45 \times L_{air}$ and $0.90 \times L_{air}$, with $L_{air}$ being a calculated antenna length for a case when only air is present as a transmission medium, the calculated antenna length $L_{air}$ resulting from an equation $L_{air} = 0.5 \times c/f$, where c is a speed of light and f is a transmission frequency; and disposing the transponder in an apex region of a tire when building the tire on an apexing machine or disposing the transponder in a bead region of the tire.

Other features which are considered as characteristic for the invention are set forth in the appended claims.

Although the invention is illustrated and described herein as embodied in a transponder to be fitted in or on the surface of articles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
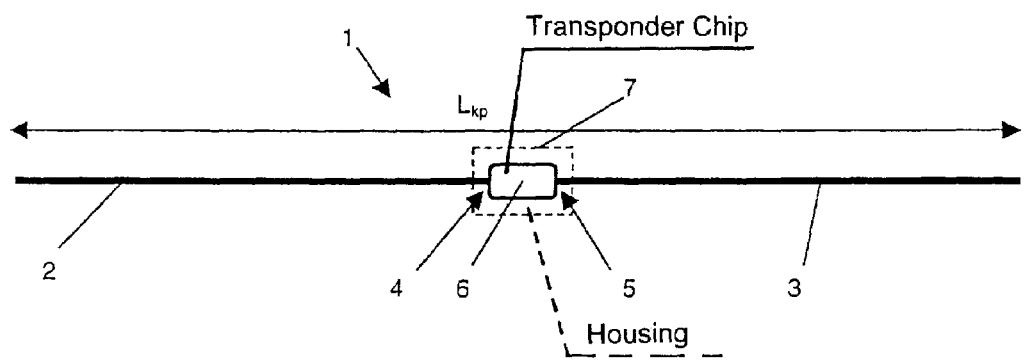
FIG. 1 is a diagrammatic view of a transponder with a dipole antenna according to the invention.

Referring now to the figures of the drawings in detail and first, particularly, to FIG. 1 thereof, there is shown a transponder 1 with a dipole antenna, which is formed of two antennas 2 and 3 disposed opposite from one another. The two antennas 2 and 3 of the dipole antenna are preferably connected to the contacts of the transponder chip via a high-strength welded connection in the regions 4 and 5. The length $L_{kp}$ indicates the optimum length of the dipole antenna, as it should be in the tire. In the exemplary embodiment, a transmission frequency f of 915 MHz and a speed of light c of approximately $300 \times 10^6$ m/s are taken as a basis. From these values, an optimum antenna length of about 16.4 cm is calculated according to the prior art if ambient air is exclusively present as the transmission medium. Extensive investigations have shown that the antenna length $L_{kp}$ of the transponder in the tire must be considerably shortened in order to increase the transmission range or bring it back to the initial value which is achieved if ambient air is exclusively present as the transmission medium. The investigations show that the maximum of the transmission range is achieved in the case of an antenna length of approximately 10.0 to 11.5 cm. In the case of a smaller or greater value, the transmission range steadily decreases.

In the case in which the transponder is integrated into the tire during tire manufacture, it must be taken into consideration that the tire material is subjected to plastic deformations, which are possibly transferred to the antenna length of the transponder. This situation must be taken into account in particular in the case of flexible or stretchable antenna constructions. In this case, the antenna length of the transponder must be dimensioned to be correspondingly shorter, so that after tire manufacture the antenna length has the value $L_{kp}$. In the case of the exemplary embodiment, the antenna length would accordingly have to be approximately 10.8 cm long after tire manufacture. The rectangle depicted by dashed lines shows the possible configuration of a housing 7, which protects the connecting regions 4 and 5 between the antennas 2 and 3 and the transponder chip 6 from mechanical loads. It is likewise conceivable to replace such a housing by embedding the encapsulated transponder chip 6 and the connecting regions 4 and 5 in epoxy resin. If the contact points of the antennas are protected by a housing, it could be possible for reasons of cost to dispense with the chip encapsulation (housing), so that the antennas are contacted directly with the silicon.

Figure 2:
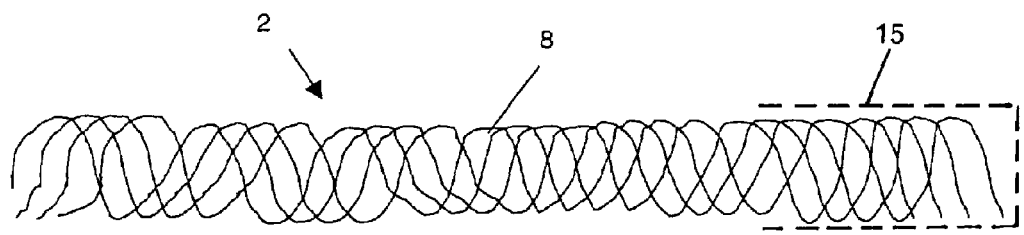
FIG. 2 is a diagrammatic view of a dipole antenna including filaments according to the invention.

FIG. 2 shows a further exemplary embodiment of the antenna 2 or 3 of the dipole antenna. In the case of this exemplary embodiment, the antenna includes individual filaments 8, which are intertwined with one another and displaceably arranged such that they are movable in relation to one another. A further variant of an embodiment is that the antenna represented in FIG. 2 is permeated with an electrically highly conductive rubber blend, which is only schematically indicated by a dashed line 15. If a filament is severed, the generally very small break can be electrically bridged through the use of the surrounding conductive rubber material. A rubber blend with a high proportion of carbon black may for example be used as a highly conductive rubber blend.

Figure 3:
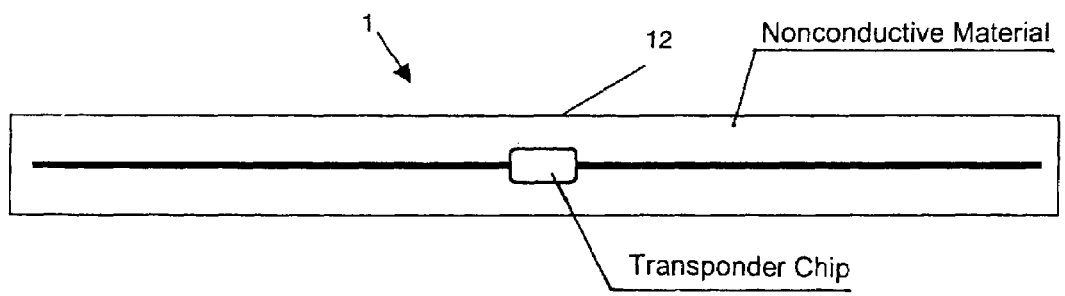
FIG. 3 is a diagrammatic view of a transponder disposed in a nonconductive material according to the invention.

FIG. 3 shows an exemplary embodiment in which the entire transponder 1 is embedded in a nonconductive material. Such embedding may be achieved by covering the transponder 1 from both sides with a strip of nonconductive material 12, for example of a silica rubber blend. Alternatively, or as an additional measure, it is possible to wrap the transponder 1 in a strip of a thermoplastic elastomer. It is likewise possible to coat the antennas additionally in advance with a nonconductive varnish or coating.

Figure 4:
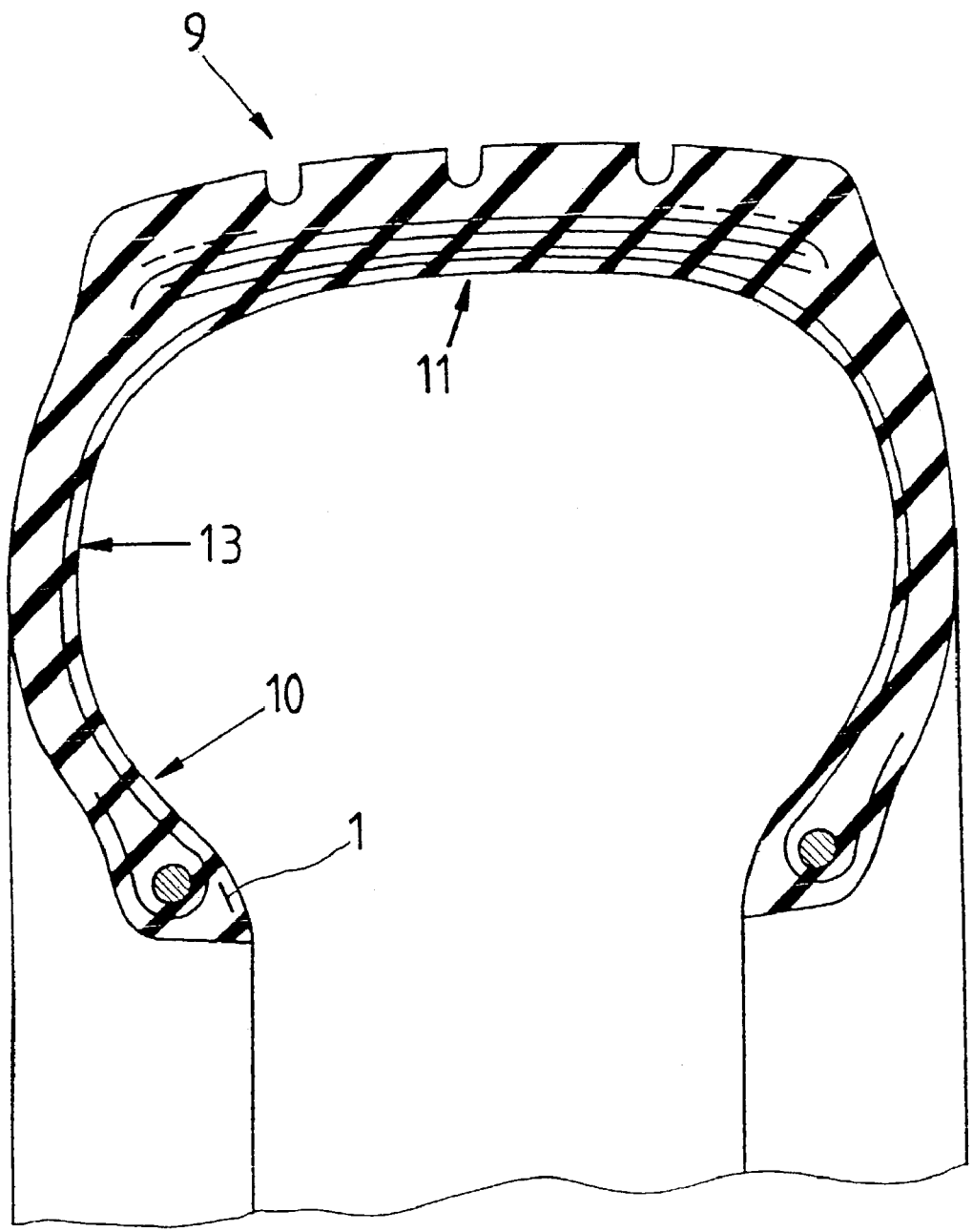
FIG. 4 is a diagrammatic sectional view illustrating a transponder disposed in the tire bead according to the invention.
Figure 5:
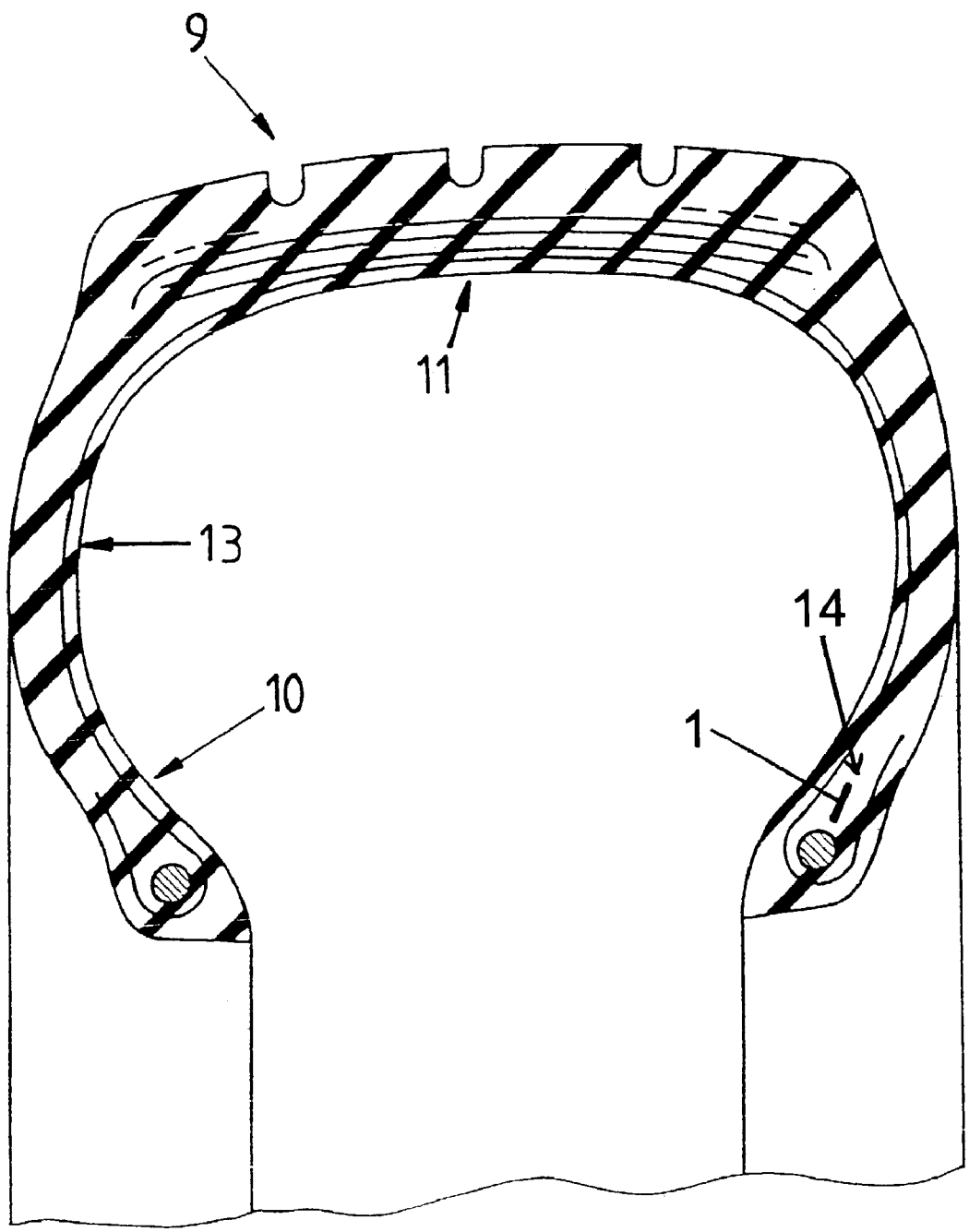
FIG. 5 is a diagrammatic sectional view illustrating a transponder disposed in the apex region of a tire according to the invention.

FIG. 4 shows a radial cross section of a tire 9. The transponder 1 is disposed in the tire bead on the inner side 10 of the tire. The transponder 1 could likewise preferably be disposed on the inner side of the tire in the zenith region 11 or in the side wall region 13 of the tire 9. FIG. 5 is a diagrammatic sectional view of a transponder 1 disposed in the apex region 14 of a tire 9.

We claim:

1. A transponder configuration, comprising:
   a transponder configured to be fitted in a location selected from the group consisting of a location in an article substantially formed of a rubber product and a location on a surface of an article substantially formed of a rubber product;
   said transponder having a dipole antenna, said dipole antenna defining a calculated antenna length $L_{air}$ for a case when only air is present as a transmission medium, the calculated antenna length $L_{air}$ resulting from an equation $L_{air}=0.5 \times c/f$, where c is a speed of light and f is a transmission frequency; and
   said dipole antenna having an antenna length $L_{kp}$ between $0.45 \times L_{air}$ and $0.90 \times L_{air}$.

2. The transponder configuration according to claim 1, wherein said dipole antenna has an antenna length $L_{kp}$ substantially between $0.61 \times L_{air}$ and $0.71 \times L_{air}$.

3. The transponder configuration according to claim 1, wherein the transmission frequency f is between 868 Mhz and 928 MHz.

4. The transponder configuration according to claim 1, wherein said dipole antenna is formed of a material selected from the group consisting of a steel and a steel alloy.

5. The transponder configuration according to claim 1, wherein said dipole antenna is formed of a beryllium-copper alloy.

6. The transponder configuration according to claim 1, wherein said dipole antenna has a surface coated with brass.

7. The transponder configuration according to claim 1, wherein:
   said dipole antenna is substantially formed of steel;
   a brass layer covers said dipole antenna; and
   a silver layer is disposed between said steel and said brass layer.

8. The transponder configuration according to claim 1, wherein:
   said transponder includes a transponder chip; and
   said dipole antenna is connected to said transponder chip via welded connections.

9. The transponder configuration according to claim 1, wherein:
   said transponder includes a transponder chip having a connection region for connecting said dipole antenna to said transponder chip; and
   said transponder chip and said connection region is disposed in one of a housing and a protective material.

10. The transponder configuration according to claim 1, wherein said dipole antenna includes a plurality of filaments selected from the group consisting of elastically deformable filaments and plastically deformable filaments.

11. The transponder configuration according to claim 1, including:
an electrically conductive material selected from the group consisting of an electrically conductive rubber blend and an electrically conductive elastomer blend;
said dipole antenna including a plurality of filaments; and
said filaments being in connection with one another via said electrically conductive material.

12. The transponder configuration according to claim 1, including:
an electrically nonconductive material; and
said transponder being entirely embedded in said electrically nonconductive material.

13. The transponder configuration according to claim 12, wherein said electrically nonconductive material is a material selected from the group consisting of a rubber blend and a thermoplastic elastomer.

14. The transponder configuration according to claim 1, wherein said dipole antenna has a surface coated with a nonconductive varnish.

15. A tire configuration, comprising:
a tire having a surface;
a transponder disposed at a location selected from the group consisting of a location in said tire and a location on said surface of said tire;
said transponder having a dipole antenna, said dipole antenna defining a calculated antenna length $L_{air}$ for a case when only air is present as a transmission medium, the calculated antenna length $L_{air}$ resulting from an equation $L_{air}=0.5 \times c/f$, where c is a speed of light and f is a transmission frequency; and
said dipole antenna having an antenna length $L_{kp}$ between $0.45 \times L_{air}$ and $0.90 \times L_{air}$.

16. The tire configuration according to claim 15, wherein:
said tire has a tire bead region; and
said transponder is disposed in said tire bead region.

17. The tire configuration according to claim 15, wherein:
said tire has an apex region; and
said transponder is disposed in said apex region.

18. The tire configuration according to claim 15, wherein said dipole antenna has an antenna length $L_{kp}$ substantially between $0.61 \times L_{air}$ and $0.71 \times L_{air}$.

19. The tire configuration according to claim 15, wherein the transmission frequency f is between 868 Mhz and 928 MHz.

20. A method of producing a tire configuration, the method which comprises:
providing a transponder with a dipole antenna having an antenna length $L_{kp}$ between $0.45 \times L_{air}$ and $0.90 \times L_{air}$, with $L_{air}$ being a calculated antenna length for a case when only air is present as a transmission medium, the calculated antenna length $L_{air}$ resulting from an equation $L_{air}=0.5 \times c/f$, where c is a speed of light and f is a transmission frequency; and
disposing the transponder in an apex region of a tire when building the tire on an apexing machine.

* * * * *